United States Patent Office 3,433,173
Patented Mar. 18, 1969

3,433,173
HYDRAULIC PUMPS AND MOTORS HAVING AXIAL PISTONS AND INCLINED SWASHPLATES
Roger Chanal, Saint-Etienne, Loire, France, assignor to Bennes Marrel, Saint-Etienne, Loire, France, a French joint-stock company
Filed Feb. 8, 1967, Ser. No. 614,663
U.S. Cl. 103—162　　　　　　　　　　　　　　1 Claim
Int. Cl. F04b 1/10

ABSTRACT OF THE DISCLOSURE

An improved bearing and lubrication arrangement is provided for hydraulic pumps and motors of the type having axial pistons and inclined swashplates. Radial and axial bearing means are provided between the cradle and the swashplate and radial lubrication passages extend between a central opening in the swashplate and the bearings to provide adequate lubrication for the same. Vibration damping means are provided between the bearings and the cradle.

---

The present invention relates to improvements brought to hydraulic pumps and motors having axial pistons and inclined swashplates. It is applicable not only to pumps having rotating piston chambers but also to pumps having fixed piston chambers and rotatable swashplates, and also to apparatus having variable tilt or fixed tilt swashplates.

The invention has for its object to reduce or eliminate certain inconveniences of known constructions, and to enable manufacture of hydraulic pumps or motors having high rotational speeds, with low upkeep and repair. Hereafter the specification will refer to pumps, but it should be understood that the term also includes motors.

A pump according to my invention having axial pistons, is mainly characterised in that its inclined swashplate is carried by a cradle, on which it rests, by two sets of needle or roller bearings, these being a ring (or pressure) bearing inserted between the plain bearing faces of the cradle and of the cylinder casing, and a second cylindrical bearing disposed co-axially with the centre of the cradle. A thin sheet of a ductile metal such as copper or aluminium is inserted between the cradle and the seat of the ring bearing, in a manner to distribute the forces thereon and to compensate any possible irregularities of machining. The rotatable swashplate has oil circulation passages arranged in a radial plane, which lubricate the flat ring bearing, unduly removing oil from the cylindrical bearing. Finally in the case of a hydraulic pump having a piston chamber, the invention permits the manufacture of the drive shaft of the chamber, its bearings and its water-tight joint, as a removable assembly which can be easily exchanged from the outside without having to dismantle the rest of the pump.

The invention will now be described further, by way of example, with reference to the accompanying drawings, in which.

Figure 1:
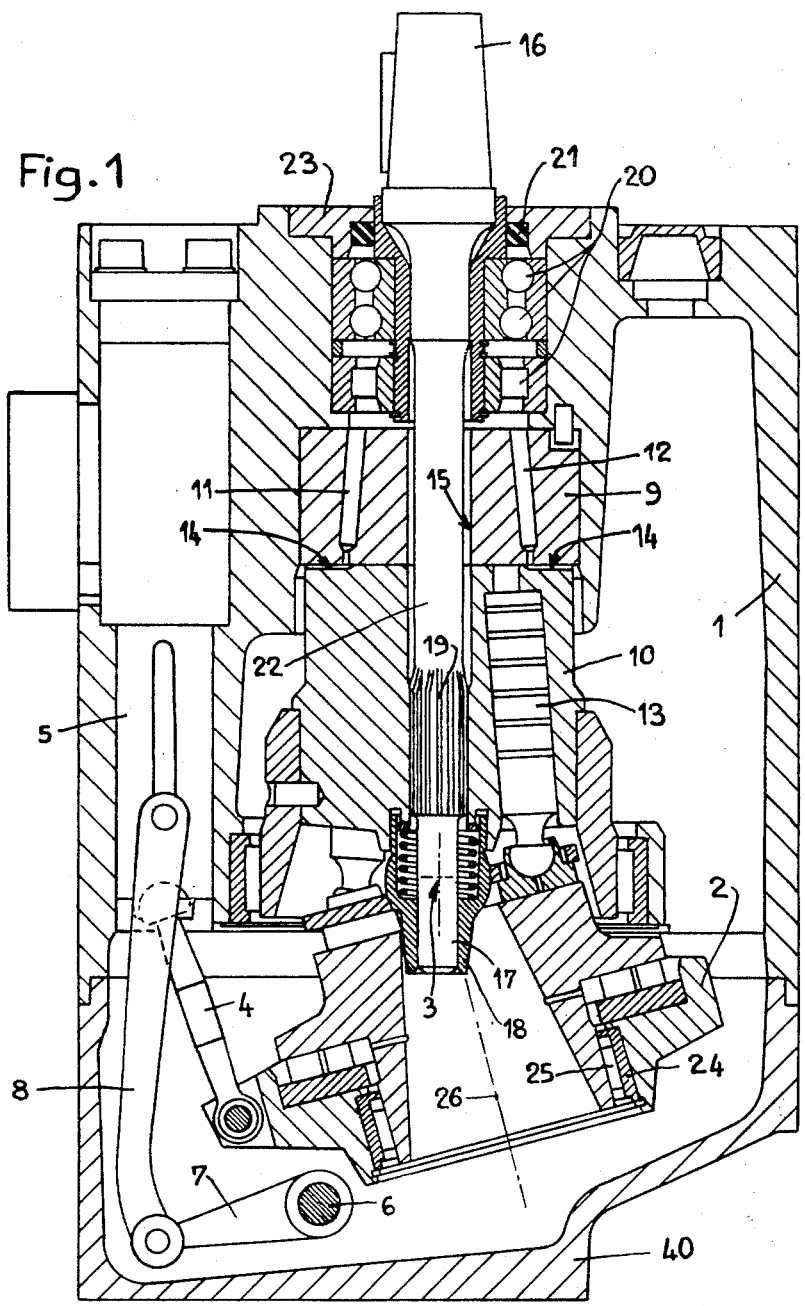
FIG. 1 is an axial section of a pump having a piston chamber and a variable output.
Figure 3:
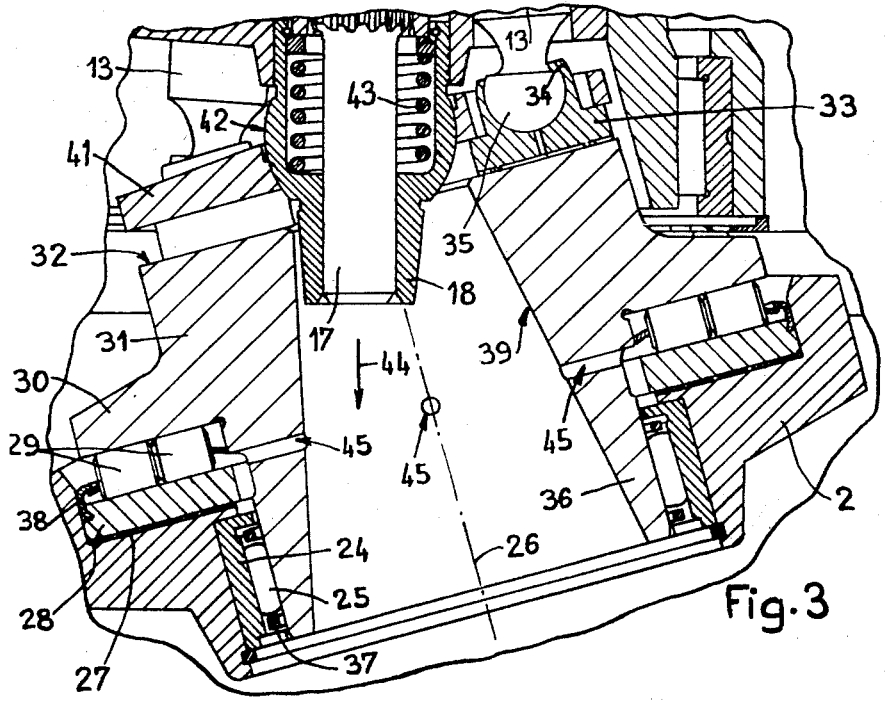
FIG. 3 is a partial sectional view showing on an enlarged scale some details of the pump shown in FIG. 1.

FIGS. 1 and 3 show a pump having a multiple piston cylinder with variable output in accordance with the invention. This pump comprises a fixed housing 1 inside which an oscillating cradle 2 is adapted to tilt about an axis perpendicular to the plan of this figure designated by the reference 3. The tilt of the cradle 2 is controlled by a link 4 actuated by a regulating mechanism 5, preferably incorporated in the housing 1. This mechanism 5 is regulated from the exterior by means of a shaft 6 the rotation of which determines the desired pump output, and the movement of which is transmitted by a crank and rod 7 and 8 respectively.

The pump comprises a valve block 9 against which turns a cylinder 10. Intake and discharge ports 11 and 12 are provided inside the valve block 9, which has sufficient thickness to prevent deformation at the liquid pressures used.

The cylinder casing 10 has several cylinder bores each of which contains a piston 13. Radial grooves 14 are formed on the bearing face of the cylinder 10 round the periphery thereof. The grooves 14 allow removal, by centrifugal effect of any leakage of liquid between the contracting faces of the casing 10 and the valve block 9. This prevents any increase in pressure in a central bore 15, which runs through the valve block 9 and a part of the casing 10. This bore carries a rotating drive shaft 16. The inner end of the shaft terminates in a cylindrical tip 17 (FIG. 3) running in a part 18 which will be described later. Above the tip 17 the shaft 16 comprises splines 19 which with corresponding slots provided in the casing 10, at the base of the bore 15.

At its apex, shaft 16 is carried in bearings 20 whilst a rotatable fluid-tight joint 21 is provided where the shaft emerges from the housing 1. Between the bearings 20 and the splines 19 the shaft 16 has an intermediate part 22 of reduced diameter and relatively great length, which acts in the manner of a torsion bar to reduce the transmission of shock loads to the driving means.

The independent assembly comprising the shaft 16, the joint 21 and the bearings 20 can be removed by removing the collar 23. This assembly can thus be easily exchanged or removed from the outside without it being necessary to dismantle the pump.

The cradle 2 has a hollow cylindrical housing carrying a bearing race 24 on the inner face of which needles 25 roll. The needle axes are parallel to the axis 26 of the cradle 2.

An upper flat face of the cradle 2 supports a thin annular sheet 27 of ductile metal such as copper, which there is a bearing race 28 of annular form. This bearing race 28 has rollers 29 on which rolls the face of a collar 30 provided on a swashplate 31. This plate is provided with an upper flat face 32 on which rests a guide plate 33 having a socket 34 which with a ball 35 on the base of piston 13 constitutes a ball and socket joint.

The rollers 29 are radially disposed on their race 28, i.e., their axes are perpendicular to the axis 26 which is common to the oscillating cradle 2 and to the swashplate 31. A skirt 36 is provided at the base of the plate 31, the outer cylinder wall of which rolls on the needles 25.

A roller cage 37 of known type is provided to maintain the needles 25 at a desired spacing. Likewise a cage 38 is also provided to guide the rollers 29.

In the swashplate 31 a frusto-conical hole 39 is made which widens downwardly. This hole permits the cradle 2 and swashplate 31 assembly to tilt to modify the output of the pump, whilst leaving the tip 17 of the shaft 16 freely accessible from the lower part of the housing 1. A pump in accordance with the invention thus presents the advantage that its shaft 16 is accessible from both ends, if the lower cover 40 of the casing 1 is replaced by a cover of similar form but provided with an access hole on the axis of the shaft 16.

The sockets 33 are in hydraulic equilibrium and they are maintained against the bearing face 32 of the swashplate 31, by a plate 41 the centre of which is provided with a part-spherical housing on which a ball face 42 rests. The end member 18 comprises a housing in which there is a compression spring 43 one end of which rests on an inner face of the casing 10; the other end urges the ball 42 in the direction indicated in FIG. 3 by the arrow 44. Thus the single spring 43 presses all the sockets 33 against the swashplate 31.

To improve the oil supply to the bearings 28–29 and 24–25 radial channels 45 are provided in the plate 31 which discharge at the level of the rollers 29 and connect them to the conical hole 39. With this arrangement, any oil or oil mist in the hole 39 can be removed by centrifugal effect by the channels 45 and passed to the rollers 29, to lubricate them. This reduces any tendency to undue extraction of oil from the needle bearings 24–25.

The pump works as follows:

The rotating shaft 16 drives the casing 10, and the piston heads move the socktes 33 on the swashplate 31, which since it is carried by bearings 28–29 and 24–25 rotates without appreciable resistance. The movement of the sockets 33 on the face 32 of the plate 31 is thus reduced to a small radial displacement due to the elliptical path which they describe. Resultant frictional loss is therefore small, due to the small amplitude and reduced speed. The provision of the bearings 28–29 and 24–25 is thus particularly advantageous in the case of a pump having a high rotational rate. The thin sheet 27 being made of a ductile metal such as copper or aluminium is compressible under the effect of the fluid forces and thus compensates for any possible inequalities of machining between the contacting faces of the cradle 2 and of the roller bearing 28. This sheet 27 also acts as a vibration damping cushion which allows the pump to rotate at a high speed.

Figure 2:
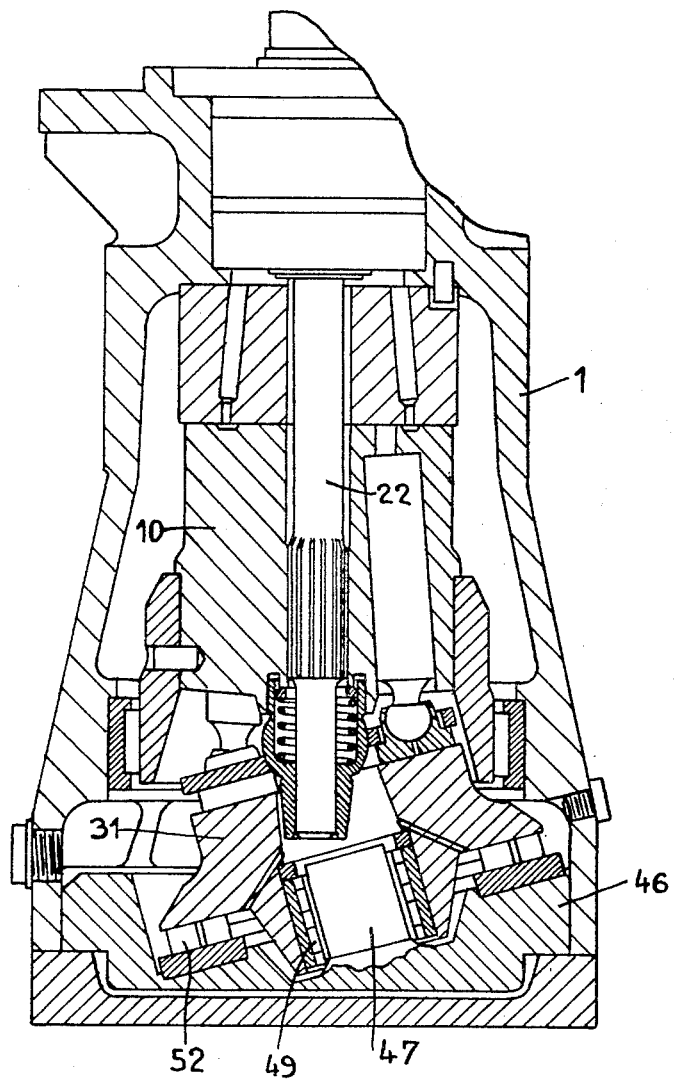
FIG. 2 is a similar section of a pump having a piston chamber with a fixed output.
Figure 4:
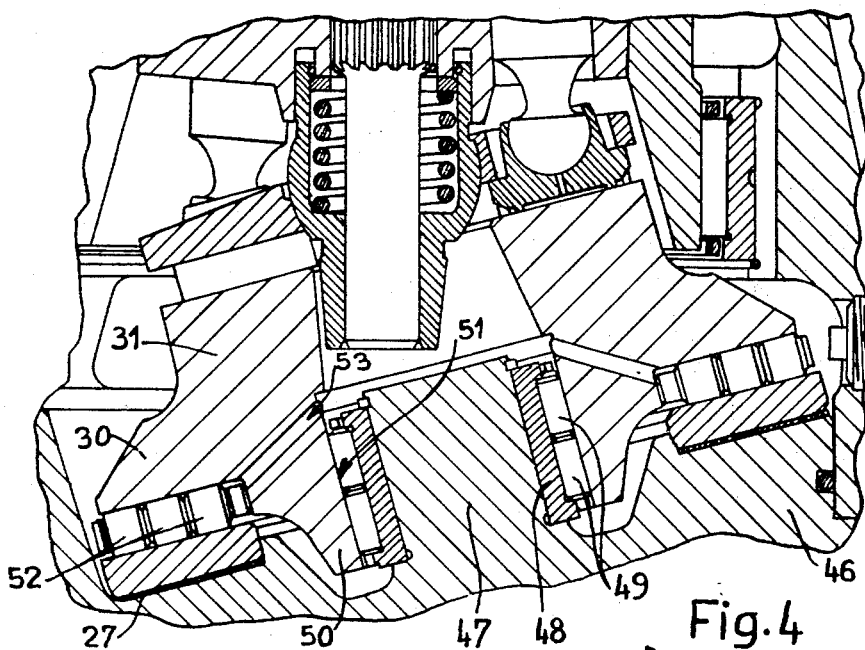
FIG. 4 is a partial sectional view showing some details of the pump shown in FIG. 2.

FIGS. 2 and 4 show another embodiment of a device in accordance with the invention. It concerns a pump having a casing with a fixed rate of output i.e., one in which the swashplate 31 is carried by a fixed cradle 46 incorporated in the housing. A cylindrical boss 47 is provided in the centre of the fixed cradle around which is mounted a ring 48 which constitutes an inner race for the rollers 49. The swashplate 31 is provided with a skirt 50 having an inner cylindrical wall 51 which surrounds the boss 47 and rolls on the outside of rollers 49. The disposition is advantageous in that it permits an axial reduction in the size of the pump and locates the bearing 49 in the centre of the bearing 52.

Here also lubricating channels 53 are provided extending radially in such a manner as to ensure direct feeding with oil of the rollers 52 without reducing the oil feed to the rollers 49. The sheet 27 plays the same role as previously.

I claim:

1. A hydraulic machine comprising a housing, a rotatable cylinder disposed in said housing and having internal walls defining substantially axially disposed piston bores, pistons located in said bores for reciprocating movement, cradle means mounted in said housing, an inclined swashplate having a central bore extending therethrough journaled on said cradle means, said swashplate having a first bearing face, hydraulically compensated slipper means mounted on said pistons and engaging said first bearing face, radial and axial roller bearing means disposed between said cradle means and said swashplate, ductile means disposed between said axial bearing means and said cradle to conform to surface irregularities and damp vibrations, and radially directed passageways extending through said swashplate from said bore to said axial bearing for passage of lubrication therethrough under the action of centrifugal forces.

References Cited

UNITED STATES PATENTS

| | | | |
|---|---|---|---|
| 3,076,345 | 2/1963 | Leclercq | 103—162 |
| 3,092,034 | 6/1963 | Bartholomaus | 103—162 |
| 3,295,457 | 6/1967 | Oram | 103—162 |
| 3,233,555 | 2/1966 | Wahlmark | 103—162 |
| 3,256,782 | 6/1966 | Ebert | 103—162 |
| 3,289,604 | 12/1966 | Wahlmark | 103—162 |
| 3,304,885 | 2/1967 | Orth | 103—162 |

FOREIGN PATENTS 855,582    8/1959    Great Britain.

WILLIAM L. FREEH, *Primary Examiner.*